United States Patent
Morey et al.

(10) Patent No.: US 7,006,727 B2
(45) Date of Patent: Feb. 28, 2006

(54) COMBINED MULTIPLEXER AND DEMULTIPLEXER FOR OPTICAL COMMUNICATION SYSTEMS

(75) Inventors: William W. Morey, Rancho Palos Verdes, CA (US); Ray T. Chen, Austin, TX (US)

(73) Assignee: Fluisar Corporation, Sunnyvale, CA (US)

( * ) Notice: Subject to any disclaimer, the term of this patent is extended or adjusted under 35 U.S.C. 154(b) by 6 days.

(21) Appl. No.: 10/097,756

(22) Filed: Mar. 14, 2002

(65) Prior Publication Data

US 2002/0131702 A1 Sep. 19, 2002

Related U.S. Application Data

(60) Provisional application No. 60/276,182, filed on Mar. 15, 2001.

(51) Int. Cl.
*G02B 6/32* (2006.01)
*G02B 6/34* (2006.01)
*H04J 14/02* (2006.01)

(52) U.S. Cl. .............................. 385/33; 385/24; 385/37; 398/82

(58) Field of Classification Search ................. 385/24, 385/33, 37; 298/79, 82, 87
See application file for complete search history.

(56) References Cited

U.S. PATENT DOCUMENTS

| 5,500,913 A | 3/1996 | Allen et al. ................ 385/48 |
|---|---|---|
| 5,657,155 A | 8/1997 | Cheng ........................ 359/341 |
| 5,703,708 A | 12/1997 | Das et al. ................... 359/140 |
| 5,708,265 A | 1/1998 | Poole ..................... 250/227.14 |
| 5,808,765 A * | 9/1998 | Laude ......................... 385/37 |
| 6,011,884 A * | 1/2000 | Dueck et al. ................. 385/24 |
| 6,108,471 A * | 8/2000 | Zhang et al. ................. 385/37 |
| 6,115,519 A | 9/2000 | Espindola et al. ............ 385/43 |
| 6,175,671 B1 | 1/2001 | Roberts ....................... 385/14 |
| 6,301,425 B1 | 10/2001 | Espindola et al. .......... 385/140 |
| 6,311,004 B1 | 10/2001 | Kenney et al. ............. 385/130 |
| 6,341,024 B1 | 1/2002 | Jeong ........................ 359/130 |
| 6,343,169 B1 * | 1/2002 | Dempewolf et al. .......... 385/37 |
| 6,351,329 B1 | 2/2002 | Greywall .................... 359/290 |
| 6,591,040 B1 * | 7/2003 | Dempewolf et al. .......... 385/37 |
| 2002/0181856 A1 * | 12/2002 | Sappey et al. ................ 385/24 |

* cited by examiner

*Primary Examiner*—John D. Lee
(74) *Attorney, Agent, or Firm*—Workman Nydegger

(57) ABSTRACT

A combined multiplexer/demultiplexer for use in optical communication systems is disclosed. The combined multiplexer/demultiplexer includes a plurality of waveguide arrays and a plurality of signal carriers, each disposed substantially symmetrically about an optical axis of the device. In operation, a signal carrier emits a multiple wavelength optical signal that is received and directed to a dispersion apparatus by a light focusing device. The dispersion apparatus diffracts the optical signal into selected spectral components and reflects the spectral components back to the waveguide arrays through the light focusing device. The signal processing, such as multiplexing and demultiplexing, performed by each waveguide array depends on their configuration. The waveguide arrays may be configured to substantially simultaneously multiplex and/or demultiplex the spectral components.

12 Claims, 2 Drawing Sheets

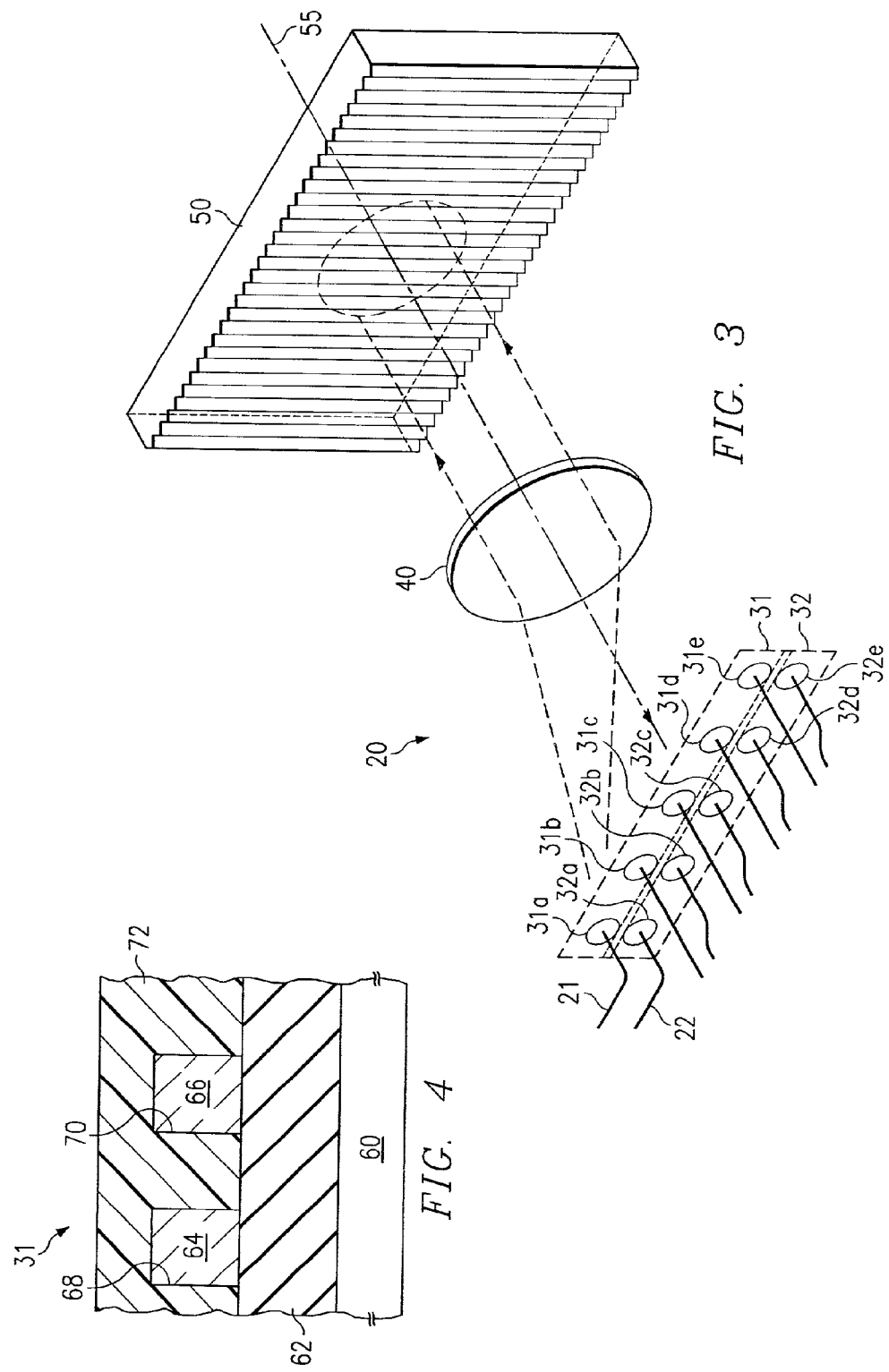

COMBINED MULTIPLEXER AND DEMULTIPLEXER FOR OPTICAL COMMUNICATION SYSTEMS

RELATED APPLICATIONS

This application claims priority from U.S. Provisional Patent Application Ser. No. 60/276,182, filed Mar. 15, 2001, and entitled "Miniaturized Reconfigurable DWDM Add/Drop System for Optical Communication Systems."

This application claims priority from Application Ser. No. 10/098,050, now U.S. Pat. No. 6,778,736, filed Mar. 14, 2002 entitled "Dynamic Variable Optical Attenuator and Variable Optical Tap", which claims priority from U.S. Provisional Patent Application Ser. No. 60/276,182, filed Mar. 15, 2001.

TECHNICAL FIELD

The present invention is related to optical communications systems for wavelength division multiplexing and demultiplexing and, more particularly, to an optical communication system having a plurality of waveguide arrays capable of substantially simultaneously multiplexing and demultiplexing multiple wavelength signals.

BACKGROUND OF THE INVENTION

The increased demand for data communication and the remarkable growth of the Internet have resulted in increased demand for communication capability within metropolitan areas. There has also been an equally large increase in demand for communication capability between large metropolitan areas. Optical communication systems using a network of fiber optic cables are being developed and installed to meet this increased demand.

The data transmission capacity of fiber optic cables and fiber optic networks has been substantially increased as a result of wavelength division multiplexing (WDM) and dense wavelength division multiplexing (DWDM). Within WDM and DWDM systems, optical signals assigned to different wavelengths are combined (multiplexed) into a multiple wavelength signal for transmission over a single fiber optic cable or other suitable signal carrier or waveguide. A typical DWDM system modulates multiple data streams on to different portions of the light spectrum. For example, one data stream may have an assigned wavelength of 1534 nanometers (nm) and the next data stream may have an assigned wavelength of 1543.8 $\mu$m. The required spacing between assigned wavelengths is generally established by International Telecommunications Union (ITU) specifications. These spacings include 0.4 nm and 0.8 nm.

Demultiplexing, the reverse process of multiplexing, typically refers to the separation of a multiple wavelength signal transmitted by a single fiber optic cable or other suitable waveguide into constituent optical signals for each wavelength. Each optical signal may be further processed to obtain the associated data stream or other information. Both multiplexing and demultiplexing are required for satisfactory operation of WDM and DWDM systems. Multiplexing and demultiplexing of optical signals in conventional DWDM systems are typically performed by two separate, relatively expensive and difficult to manufacture optical devices.

SUMMARY OF THE INVENTION

In accordance with teachings of the present invention, a system is provided for demultiplexing, and multiplexing multiple wavelength optical signals using a waveguide array, a light focusing device and a dispersion apparatus. An array of waveguides formed in accordance with teachings of the present invention in combination with a light focusing device and a dispersion apparatus may function substantially simultaneously as both a multiplexer and a demultiplexer.

In a further aspect, the present invention provides a signal processing device having a plurality of waveguides arranged in at least two arrays and a signal carrier associated with each array. The arrays and the signal carriers are preferably substantially symmetrically disposed relative to an optical axis of the device. Each waveguide array is operable to perform a signal processing operation on a signal emitted from the signal carriers upon reflection of the signal from a dispersion apparatus.

Technical benefits of the present invention include providing a communication system or network with substantially reduced manufacturing costs as compared to a conventional communication system or network requiring a wavelength division demultiplexer and a wavelength division multiplexer. A single device having an array of waveguides formed in accordance with teachings of the present invention may function both as a multiple wavelength optical signal multiplexer and demultiplexer thereby generally reducing the number of multiplexers and demultiplexers required for a given number of optical signals.

A combined multiplexer/demultiplexer formed in accordance with teachings of the present invention may use the same imaging and beam optics, diffraction grating and mechanical packaging to both multiplex and demultiplex multiple wavelength optical signals. Additional technical benefits of the present invention include substantial savings of cost, space and weight. The present invention is particularly advantageous when more than one multiplexer or demultiplexer is required at the same location in an optical communication system or network. For some applications, multiple wavelength optical signals from different channels of a principle fiber line may be separated, dropped, added or cross connected and then recombined into a multiple wavelength optical signal without requiring the use of separate multiple wavelength multiplexers and multiple wavelength demultiplexers.

BRIEF DESCRIPTION OF THE DRAWINGS

A more complete and thorough understanding of the present invention and its advantages may be acquired by referring to the following description taken in conjunction with the accompanying drawings, in which like reference numbers indicate like features, and wherein:

FIG. 3 is a schematic drawing showing an isometric view of yet another embodiment of a combined multiplexer/demultiplexer formed in accordance with teachings of the present invention; and FIG. 4 is a schematic drawing in section showing a portion of a waveguide array formed using semiconductor techniques and in accordance with teachings of the present invention.

DETAILED DESCRIPTION OF THE INVENTION

Figure 1:
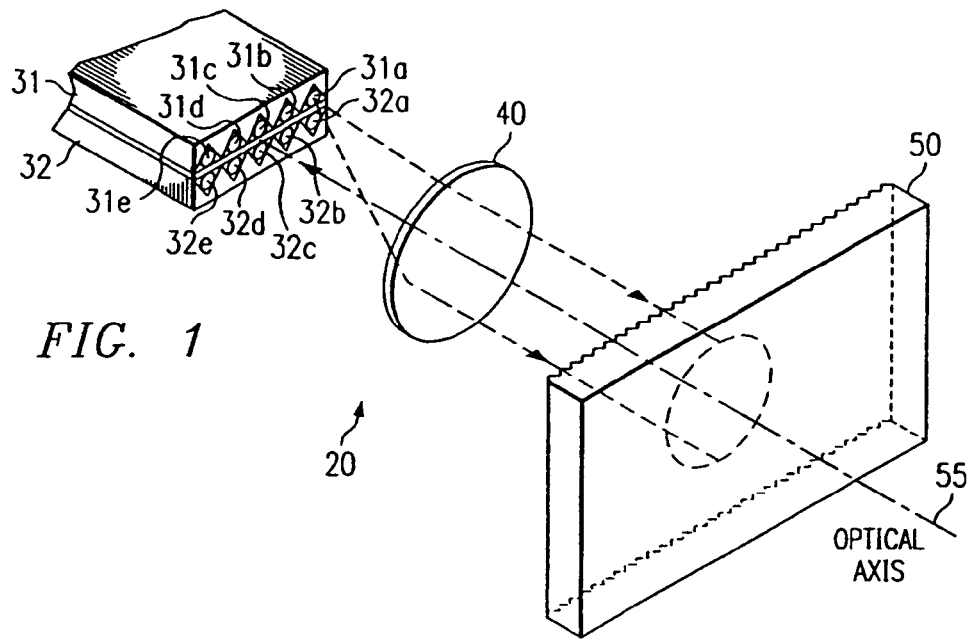
FIG. 1 is a schematic drawing showing an isometric view of a combined multiplexer/demultiplexer formed in accordance with teachings of the present invention.

Preferred embodiments of the present invention and its advantages are best understood by referring to FIGS. 1 through 4 of the drawings, like numerals being used for like and corresponding parts of the various drawings.

The terms "optical signal or signals" and "light signal or signals" are used in this application to include the full range of electromagnetic radiation which may be satisfactorily used to communicate information using a waveguide, signal carrier and/or fiber optic cable. A combined multiplexer/demultiplexer incorporating teachings of the present invention may be satisfactorily used with such optical signals.

The term "combined multiplexer/demultiplexer" is used in this application to refer to an optical device which may be satisfactorily used to substantially simultaneously multiplex multiple wavelength optical signals and demultiplex multiple wavelength optical signals. A combined multiplexer/demultiplexer formed in accordance with teachings of the present invention may also be used to only demultiplex multiple wavelength optical signals or multiplex multiple wavelength optical signals as desired for a specific communication system.

The term "waveguide" is used in this application to include the full range of optical devices which may be used to satisfactorily communicate optical signals. A waveguide typically includes a core formed from a first optical material and disposed in a channel formed in a second optical material. A fiber optic cable is one example of a specific type of waveguide. A communication system or network formed in accordance with teachings of the present invention may be satisfactorily used with single mode, multiple mode, or a combination of single mode and multiple mode fibers as input and output fibers and to form fiber or waveguide arrays. Waveguides satisfactory for use with the present invention may have various configurations other than fiber optic cables or cores disposed in a channel formed on a substrate.

Various features of the present invention will be described with respect to an optical communication system or signal processing system. An optical communication system or signal processing system formed in accordance with teachings of the present invention may be satisfactorily used in long distance fiber optic communication systems (not expressly shown), large metropolitan area optical communication systems (not expressly shown) or any other environment where the multiplexing and demultiplexing of optical signals is desired. Various features of the present invention will be described with respect to a multiple wavelength signal having four spectral components ($\lambda_1$, $\lambda_2$, $\lambda_3$ and $\lambda_4$). However, the present invention may be used with multiple wavelength optical signals having any number of spectral components or wavelengths.

The combined multiplexer/demultiplexer of the present invention preferably allows a single signal processing module to substantially simultaneously perform multiplexing and demultiplexing or more than one multiplexing or demultiplexing operation while sharing preferred optical components. To enable such operation, a plurality of arrays or sets of waveguides are preferably substantially symmetrically disposed relative to the optical axis of the device, creating inversion symmetry about the optical axis.

FIG. 1 is a schematic drawing showing a portion of a combined multiplexer/demultiplexer 20 that may be satisfactorily used with a variety of communication systems. A combined multiplexer/demultiplexer incorporating teachings of the present invention may also be used with optical sensors and spectroscopy equipment.

Figure 2:
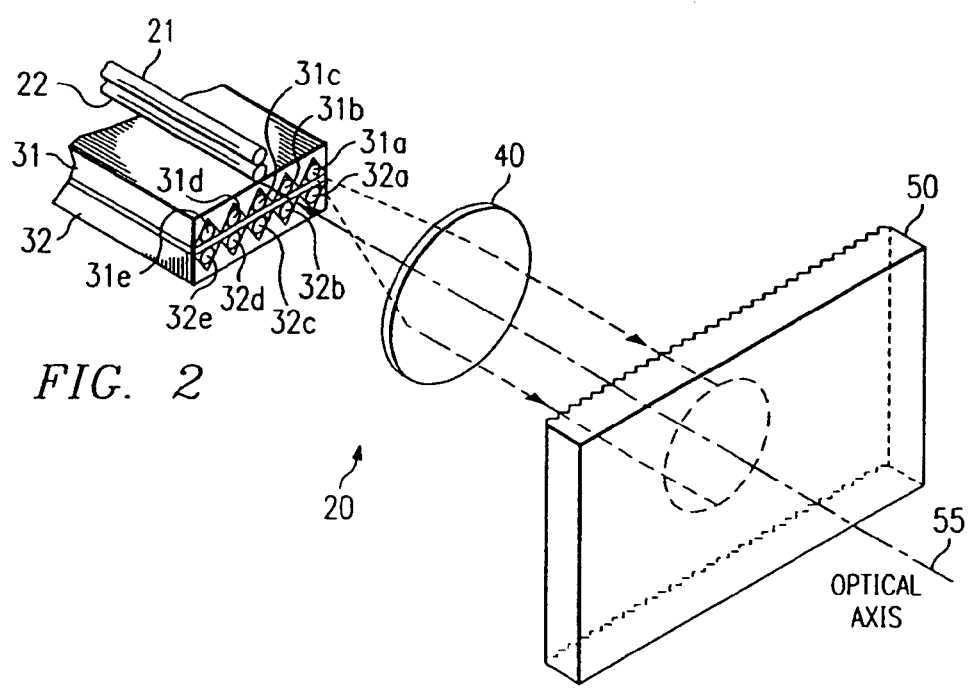
FIG. 2 is a schematic drawing showing an isometric view of an alternate embodiment of a combined multiplexer/demultiplexer formed in accordance with teachings of the present invention.

For the embodiment of the present invention shown in FIGS. 1 through 3, combined multiplexer/demultiplexer 20 preferably includes an input signal carrier or fiber optic cable 21 and an output signal carrier or fiber optic cable 22. Wavelength division multiplexing (WDM) or dense wavelength division multiplexing (DWDM) techniques may be used to allow each fiber optic cable 21, 22 to transmit multiple optical signals at various wavelengths which substantially increases the efficiency of fiber optic cables 21 and 22.

Referring to the embodiment of the present invention shown in FIGS. 1 and 3, input fiber 21 is preferably disposed at one end of first waveguide array 31 and output fiber 22 is disposed at the same end of second waveguide array 32. Alternatively, as illustrated in FIG. 2, input fiber optic cable 21 and output fiber optic cable 22 may be included external to waveguide arrays 31 and 32. In general, input fiber 21 is preferably located immediately adjacent to and disposed above output fiber 22.

Also as illustrated in FIGS. 1 and 3, a portion of input fiber optic cable 21 may be used as an additional waveguide or as a portion of a waveguide in waveguide array 31. In a similar manner, a portion of output fiber optic cable 22 may be used to provide an additional waveguide or as a portion of a waveguide in waveguide array 32.

Cables 21 and 22 are described herein as input and output cables, respectively. However, assorted combinations of input and output cables may be employed with combined multiplexer/demultiplexer 20.

Additional optical components of combined multiplexer/demultiplexer 20 preferably include light focusing device 40 and dispersion apparatus or diffraction grating 50. As shown in FIGS. 1 through 3, waveguide arrays 31 and 32 are preferably disposed adjacent to and optically aligned with light focusing device 40 such as a collimating and focusing lens to allow projection of a multiple wavelength signal through light focusing device 40 and on to diffraction grating 50.

Light focusing device 40 preferably collimates multiple wavelength optical signals emitted from input fiber optic cable 21 or waveguide 31a and directs the collimated light toward diffraction grating 50. Light focusing device 40 may include one or more lenses or lens assemblies. For some applications, light focusing device 40 may include a single bi-convex lens or any other lens assembly operable to collimate diverging light or focus collimated light as desired.

For some applications, diffraction grating 50 may have a blazed surface (not expressly shown). In addition, various types of dispersion apparatuses 50 such as reflective and transmissive diffraction gratings may be satisfactorily used with a combined multiplexer/demultiplexer 20 formed in accordance with teachings of the present invention. For some applications diffraction grating 50 may be a Littrow assembly or a Litmann Metcalf assembly or any other diffraction grating 50 satisfactory for separating a multiple wavelength optical signal into selected spectral components and combining individual optical signals corresponding with selected spectral components into a multiple wavelength optical signal. Various types of dispersion apparatuses in addition to diffraction gratings may also be used.

Light focusing device 40 and diffraction grating 50 are preferably optically positioned relative to each other such that when a collimated multiple wavelength optical signal is directed to diffraction grating 50, the multiple wavelength signal will be diffracted into selected spectral components. Upon diffraction of the multiple wavelength optical signal into selected spectral components or optical signals, diffraction grating 50 preferably reflects the spectral components toward light focusing device 40 which then directs the spectral components to one or more waveguides 31a through 31e and/or 32a through 32e in waveguide arrays 31 and 32. Additional detail regarding the operation of combined multiplexer/demultiplexer 20 will be discussed below.

As mentioned above, waveguides 31a through 31e and 32a through 32e may be formed from multi-mode materials. Consequently, each multi-mode waveguide may absorb more than one spectral component diffracted by and reflected from dispersion apparatus 50. In addition, waveguides 31a through 31e and 32a through 32e may be coupled with various types of optical devices, additional waveguides, etc., for further signal processing.

The existence of substantially symmetric inversion about optical axis 55 and reflection from diffraction grating 50 enables the signal transfer and processing described herein. Multiple fiber layers, waveguides and/or waveguide arrays may be used independently to make multiple multiplexers, demultiplexers, or combined multiplexer/demultiplexers in a single module capable of sharing beam handling optics and dispersion elements.

First waveguide array 31, second waveguide array 32, light focusing device 40 and diffraction grating 50 are preferably optically aligned with each other along optical axis 55. As illustrated in FIGS. 1 and 3, first waveguide array 31 and second waveguide array 32 are preferably substantially symmetrically disposed relative to optical axis 55. As illustrated in FIG. 2, fiber optic cables 21, 22 and waveguide arrays 31, 32 are preferably substantially symmetrically disposed on opposing sides of optical axis 55, respectively. As a result of this inverse symmetry about optical axis 55, combined multiplexer/demultiplexer 20 may substantially simultaneously demultiplex multiple wavelength optical signals received from fiber optic input cable 21 and multiplex respective optical signals into a multiple wavelength optical signal.

Processed signals may be directed to fiber optic output cable 22 for transmission, for example. In addition, one or more of waveguides 31a through 31e or 32a through 32e may be used to communicate processed signals. One advantage of forming a combined multiplexer/demultiplexer in accordance with teachings of the present invention stems from the reduced costs and manufacturing difficulties of using common optical beam handling components and dispersion components.

In general operation, as mentioned above, input fiber optic cable 21 preferably provides multiple wavelength signal ($\lambda_1$, $\lambda_2$, $\lambda_3$, $\lambda_4$) to dispersion apparatus 50, which is capable of diffracting a multiple wavelength signal into selected spectral components or wavelengths. Upon diffraction by and reflection from diffraction grating 50 the spectral component corresponding with wavelength $\lambda_1$ is preferably absorbed by waveguide 32b, for example. In a similar manner the spectral components corresponding with wavelengths $\lambda_2$, $\lambda_3$ and $\lambda_4$ are preferably directed to fiber optic cables and/or waveguides 32c, 32d and 32e, respectively. Using mutli-mode fibers as waveguides, more than one spectral component may be absorbed or received by each so configured waveguide.

Illustrated in FIG. 2 is a diffraction based, combined multiplexer/demultiplexer 20 using two (2) fibers for either signal input 21 or output 22, depending on whether the device's use is as a multiplexer/demultiplexer, a multi-demultiplexer or a multi-multiplexer. Below each of the respective signal carriers 21, 22, at an approximately equal distance from optical axis 55, i.e., substantially symmetrically disposed relative to optical axis 55, are corresponding waveguide arrays 31 and 32.

In one operating example of the combined multiplexer/demultiplexer illustrated in FIG. 2, input fiber 21 could be an input fiber from a telecommunications line containing many different wavelength channels. The signal emitted by fiber optic cable 21 is preferably received and directed to diffraction grating 50 by light focusing device 40. Diffraction grating 50 preferably disperses and reflects the signal back to light focusing device 40 where the dispersed signal is subsequently directed back to the bottom row of receiving fibers in waveguide array 32. A different wavelength signal may then be absorbed by a different waveguide 32a through 32e in waveguide array 32 to be separated or demultiplexed, for example. In an opposing manner, waveguide array 31 could be substantially simultaneously used to recombine or multiplex the dispersed signal, one wavelength being absorbed by each waveguide 31a through 31e of first waveguide array 31. The recombined or multiplexed signal may then be communicated by output fiber 22; thus, forming a combined multiplexer/demultiplexer 20 into a single module or package.

During operation of the combined multiplexer/demultiplexer 20 illustrated in FIG. 3, for example, input fiber 21 may be used to communicate a multiple wavelength optical signal to waveguide 31a. Light focusing device 40 then preferably receives the signal emitted from waveguide 31a/input fiber optic cable 21 and directs the signal to diffraction grating 50. Diffraction grating 50 then preferably disperses the multiple wavelength signal into selected spectral components. The spectral components produced by diffraction grating 50 may be altered and are generally based on the configuration of diffraction grating 50.

In addition to diffracting the multiple wavelength optical signal into selected spectral components, diffraction grating 50 preferably reflects the diffracted signal or spectral components back to light focusing device 40 which subsequently directs the spectral components to respective waveguides 32b through 32e of second waveguide array 32, for example. As described, second waveguide array 32, light focusing device 40 and diffraction grating 50 function in combination as a demultiplexer.

To extend the functionality of the present invention, a plurality of optical switches (not expressly shown) may be included to direct the respective optical signals ($\lambda_1$, $\lambda_2$, $\lambda_3$ or 80$_4$) to respective drop ports (not expressly shown). Similarly, optical signals having respective wavelengths $\lambda_1$, $\lambda_2$, $\lambda_3$ and $\lambda_4$ may be directed to add ports (not expressly shown). Further, by combining two or more waveguide arrays substantially symmetrically about the optic axis of a fiber optic multiplexer, one can build multi-combined multiplexer/demultiplexer device capable of sharing common optical beam handling and dispersion components such as light focusing device 40 and diffraction grating 50.

In addition, one or more amplifiers (not expressly shown) may be coupled with input fiber optic cable 21 and output fiber optic cable 22, or waveguides 31a through 31e and 32a through 32e. Combined multiplexer/demultiplexer 20 may also be configured to form a bi-directional wavelength division multiplexer/demultiplexer and to further include at least one array of optical switches.

For the embodiment of the present invention shown in FIG. 1, first waveguide array 31 and second waveguide array 32 may be formed from a plurality of fiber optic cables disposed in respective "v" grooves. For other applications, see FIGS. 2 and 3, first waveguide array 31 and second waveguide 32 may be formed using semiconductor fabrication techniques, such as by placing a waveguide core in a respective waveguide channel. See FIG. 4. Teachings of the present invention allow fabricating multiple waveguide arrays stacked relative to each other, using a variety of semiconductor fabrication techniques.

FIG. 4 shows one example of how waveguides and/or waveguide arrays may be formed on a substrate using semiconductor fabrication techniques. For the embodiment of waveguide array 31 shown in FIG. 4, substrate 60 may be part of a typical silicon wafer used in semiconductor fabrication. However, a combined multiplexer/demultiplexer may be formed in accordance with teachings of the present invention on a wide variety of substrates and is not limited to use with only conventional silicon substrates.

As illustrated in FIG. 4, waveguide array 31 preferably includes layer 62 disposed immediately adjacent to substrate 60. Layer 62 may be formed from various types of material such as silicon dioxide ($SiO_2$), or other materials such as Teflon AF240. First core 64 and second core 66 may be formed from various types of material such as a combination of silicon dioxide and germanium oxide ($SiO_2$:$GeO_2$) with an index of refraction of approximately 1.4538. Cores 64 and 66 may represent individual waveguides or waveguide arrays. For some applications, layer 62 may have a thickness of approximately fifteen micrometers (15 $\mu$m) with an index of refraction of approximately 1.445.

Cores 64 and 66 are preferably formed on layer 62 and disposed in respective channels 68 and 70 formed in cladding layer 72. For one embodiment, channels 68 and 70 preferably have a generally rectangular cross section with dimensions in the range of approximately six or seven micrometers (6 or 7 $\mu$m). Layer 72 may sometimes be referred to as "top cladding". Layer 72 may be formed from Teflon AF 1600 having an index of refraction of approximately 1.31.

The thermal optic coefficient of many polymers is generally less than zero. As a result, when the temperature of such polymers is increased, the corresponding index of refraction is reduced. Teflon AF 1600 represents one example of a polymer having the desired thermal optic coefficient.

For other applications first layer 62 may be formed from silicon dioxide having a thickness of approximately 2.4 micrometers (2.4 $\mu$m). Second layer or top cladding 72 may be formed from a polymeric material such as Ultradel 9021 having an index of refraction of approximately 1.526. Cores 64 and 66 may be formed from Ultradel 9120 having an index of refraction of approximately 1.5397.

For still other applications first layer 62 may be formed from Teflon AF 240 having an index of refraction of approximately 1.29. Second layer or top cladding 72 may be formed from Teflon AF 240 having an index of refraction of 1.29. The thickness of first layer 62 may be approximately five micrometers (5 $\mu$m). Cores 64 and 66 may be formed from Teflon AF 160 having an index of refraction of approximately 1.31.

Cores 64 and 66 may be formed from a wide variety of materials including polyimide, Teflon, PFCB, a mixture of silicon dioxide and polymer, ion exchange and polymer and fluorinated polyimide. Layer 72 may be formed from Ultradel polymer U 9120 having a refraction index of 1.5397 and core 64 and 66 of Ultradel U 9020 having a refraction index of 1.526.

Although the present invention has been described with respect to a specific preferred embodiment thereof, various changes and modifications may be suggested to one skilled in the art and it is intended that the present invention encompass such changes and modifications fall within the scope of the appended claims.

What is claimed is:

1. An apparatus comprising:
    a first waveguide array having a plurality of waveguides disposed therein;
    a second waveguide array having a plurality of waveguides disposed therein, the second waveguide array disposed proximate the first waveguide array and substantially symmetrically disposed on opposite sides of an optical axis of the apparatus as compared to the first waveguide array;
    at least one light focusing device operable to receive an optical signal to be demultiplexed and to direct the received optical signal to be demultiplexed to a dispersion apparatus aligned therewith, the at least one light focusing device further operable to receive a plurality of optical signals to be multiplexed from the first waveguide array and to direct the received plurality of optical signals to be multiplexed to the dispersion apparatus aligned therewith;
    the dispersion apparatus operable to disperse the received optical signal to be demultiplexed into a plurality of selected spectral wavelengths and to reflect the selected spectral wavelengths in a plurality of demultiplexed optical signals back to the light focusing device, the dispersion apparatus further operable to combine the received plurality of optical signals to be multiplexed and to reflect the combined multiplexed optical signal back to the light focusing device; and
    the light focusing device operable to direct the reflected plurality of demultiplexed optical signals to at least the second waveguide array.

2. The apparatus of claim 1 further comprising at least a portion of the plurality of waveguides including single mode fibers.

3. The apparatus of claim 1 further comprising at least a portion of the plurality of waveguides including multi-mode fibers.

4. The apparatus of claim 1 further comprising the plurality of waveguides including a combination of multimode and single mode fibers.

5. The apparatus of claim 1 wherein the multiplexing and the demultiplexing occur substantially simultaneously.

6. The apparatus of claim 1 further comprising the waveguide arrays and the signal carriers integrated into a single package.

7. The apparatus of claim 6 further comprising:
    the single package including a plurality of vchannels; and
    each v-channels operable to maintain a waveguide therein.

8. The apparatus of claim 1 further comprising:
    a substrate;
    a cladding layer disposed on a first surface of the substrate; and the waveguides or the first and second waveguide arrays formed from respective cores disposed in the cladding layer.

9. The apparatus of claim 1 wherein the dispersion apparatus includes a diffraction grating.

10. The apparatus of claim 9 wherein the diffraction grating has a blazed surface.

11. A signal processing device operable to substantially simultaneously perform a plurality of signal processing operations comprising:
a plurality of waveguides arranged in each of first and second waveguide arrays;
a signal carrier operably coupled to each of the first and second waveguide arrays;
the first and second waveguide arrays disposed on opposite sides of an optical axis of the device; and
the second waveguide array is operable to perform a demultiplexing signal processing operation on a multiple wavelength signal emitted from a signal carrier upon reflection of the multiple wavelength signal from a dispersion apparatus and through a light focusing device, and the first waveguide array is operable to provide a plurality of optical signals to the dispersion apparatus via the light focusing device.

12. A combination multiplexer/demultiplexer comprising:
a first waveguide array disposed proximate a second waveguide array;
a signal carrier coupled with the first waveguide array and a signal carrier coupled with the second waveguide array;
at least one light focusing device operable to receive a multiple wavelength optical signal from at least one signal carrier to be demultiplexed and operable to direct the demultiplexed optical signal to at least one waveguide of the second waveguide array, the at least one focusing device further operable to receive from the first waveguide array a plurality of optical signals to be multiplexed;
a diffraction grating optically aligned with the light focusing device and operable to demultiplex a multiple wavelength optical signal into selected spectral wavelengths and further operable to combine the received plurality of optical signals to be multiplexed;
the waveguide arrays generally symmetrically disposed on opposite sides of an optical axis of the combined multiplexer/demultiplexer; and
the combined multiplexer/demultiplexer operable to substantially simultaneously multiplex and demultiplex a multiple wavelength optical signal.

* * * * *